Jan. 22, 1963 TAKASHI ISHIDATE 3,075,181

ADDRESS SELECTION SYSTEM FOR MAGNETIC-CORE MATRIX MEMORY APPARATUS

Filed Feb. 11, 1958 2 Sheets-Sheet 1

Inventor
T. ISHIDATE
By Robert Harding Jr.
Attorney

Jan. 22, 1963 TAKASHI ISHIDATE 3,075,181

ADDRESS SELECTION SYSTEM FOR MAGNETIC-CORE MATRIX MEMORY APPARATUS

Filed Feb. 11, 1958 2 Sheets-Sheet 2

Inventor
T. ISHADATE

By Robert Harding Jr.
Attorney

United States Patent Office 3,075,181
Patented Jan. 22, 1963

3,075,181

ADDRESS SELECTION SYSTEM FOR MAGNETIC-CORE MATRIX MEMORY APPARATUS

Takashi Ishidate, Tokyo, Japan, assignor to Nippon Electric Company Limited, Tokyo, Japan, a corporation of Japan Filed Feb. 11, 1958, Ser. No. 714,644
Claims priority, application Japan Feb. 22, 1957
4 Claims. (Cl. 340—174)

This invention relates to an address selection system for alternating-current two-frequency-type magnetic-core matrix memory apparatus used with circuits containing the switching elements using subharmonic oscillations (sometimes referred to as "Parametron").

One of the objects of the invention is to provide a selection system for a magnetic-core matrix memory apparatus operating on alternating current which will require less current to operate than systems of this type heretofore used and in which the characteristic requirements of the individual memory cores will be less rigorous than those of the cores of known systems.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
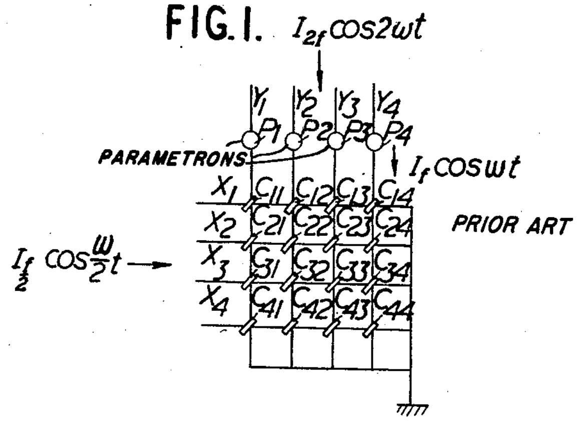
FIGS. 1 and 2 are schematic representations of a conventional system.

FIG. 1 illustrates an example of the conventional system in which an ordered set of sixteen magnetic cores, such as C11, C12 . . . C44, is arranged in a square array, or a matrix. While the present invention is exemplified by a number of sixteen cores, the invention will equally apply, in general, to cases in which a multiplicity of magnetic cores are arranged in a matrix form.

The switching elements P1 to P4 which are in the circuits of the columns Y1–Y4 are the "Parametrons" which use subharmonic oscillations for their operation. A "Parametron" is a resonance element having inductance and capacity one of which, usually the inductance, is varied periodically. A "Parametron" having a variable inductance may be made of two ferrite cores each having a primary winding of a single turn, these windings being connected in series, and a secondary winding of ten turns, these windings being connected in reverse. The series connected secondary windings are connected across the plates of a condenser. The primary windings are excited by an alternating current and the circuit including the secondary windings and the condenser is tuned to one half of the frequency of the exciting current. When excitation current is applied to the primary windings, the resonance circuit is shocked into oscillation at half the frequency of the excitation current and at either of two phases 180° apart depending on a previous excitation.

The "Parametron" switching elements are illustrated schematically by a circle with only the input and output connections shown.

To have the system of FIG. 1 perform the address selection, select any one column out of Y1, Y2, Y3 and Y4 and excite one of the switching elements P1 through P4 by a current $I_{2f}\cos 2wt$ $(w=2\pi f)$ of the frequency $2f$. The element thus selected will supply a current $I_f \cos wt$ to the associated Y column. On the other hand, select one of the horizontal row conductors from among X1, X2, X3 and X4 to supply a current $$I_{\frac{f}{2}} \cos \frac{w}{2}t$$

to the selected conductor. Thus a magnetic core located at the intersection if said X and Y axes will be selected. With this system, there is a drawback such that, since the efficiency of element P is only about 30 percent, the current to be conducted in a Y-column, or $I_{2f}\cos 2wt$, must be larger than that in an X-row or $$I_{\frac{f}{2}} \cos \frac{w}{2}t$$

to insure the supply of current necessary for memory to the magnetic core.

Figure 2:
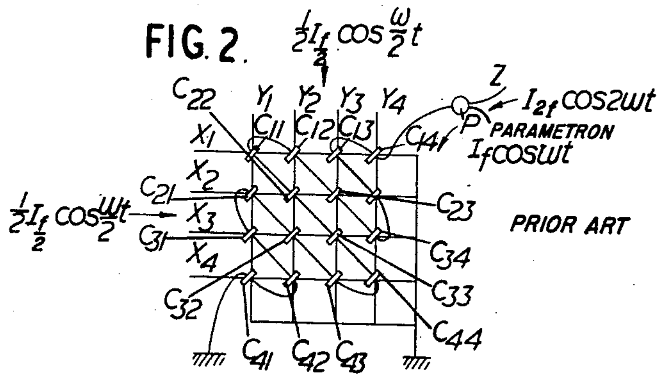

FIG. 2 illustrates diagrammatically a publicly known system to be considered an improvement of the system illustrated in FIG. 1. In this figure, P represents a switching element using subharmonic oscillations fed with a current $I_{2f}\cos 2wt$ from an electric source Z. (It will be noted here that the value of $I_{2f}$ in FIGS. 2 or 3 by no means coincides with that of $I_{2f}$ in FIG. 1).

This system performs the address selection utilizing operations, as follows: Instead of using one switching element per column, a current of frequency $$\frac{f}{2}$$

is shared by an X-row and Y-column. In other words, a current $$\frac{1}{2} I_{\frac{f}{2}} \cos \frac{wt}{2}$$

is conducted in each one conductor selected from the X and Y axes. As a consequence, a current $$I_{\frac{f}{2}} \cos \frac{w}{2}t$$

will flow through the magnetic core at the intersection while either 0 or $$\frac{1}{2} I_{\frac{f}{2}} \cos \frac{wt}{2}$$

will flow through the rest of magnetic cores.

It will be known, then that the characteristics of the memory magnetic core must be rigorous enough so that writing-in, reading-out or distracting-of-memory may not be performed by a current $$\frac{1}{2} I_{\frac{f}{2}} \cos \frac{wt}{2}$$

flowing through a non-selected core and that the complete write-in and read-out operations may be performed by a current $$I_{\frac{f}{2}} \cos \frac{wt}{2}$$

flowing through the selected magnetic core.

The present invention intends to obviate both the disadvantage with the system of FIG. 1, or control of a heavy current in Y-column, and that with the system of FIG. 2, or the required rigorous characteristics of the memory magnetic core. An embodiment of the invention is illustrated in FIG. 3.

Figure 3:
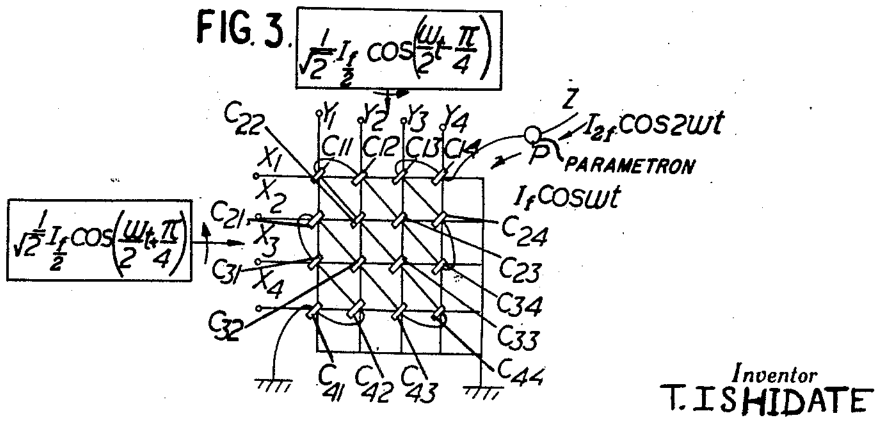
FIG. 3 is a schematic representation of the system of the invention.

Whereas two electric sources of frequency $$\frac{f}{2}$$

for supplying a current $$\frac{1}{2}I_{\frac{f}{2}}\cos\frac{wt}{2}$$

are assigned equally to an X-row and a Y-column in FIG. 2, FIG. 3 differs therefrom in that two different kinds of sources of frequency $$\frac{f}{2}$$

are assigned. Stated more specifically, two different kinds of currents, one $$I_1=\frac{1}{\sqrt{2}}I_{\frac{f}{2}}\cos\left(\frac{wt}{2}+\frac{\pi}{4}\right)$$

which is advanced in phase by $$\frac{\pi}{4}$$

with respect to an optimum current for writing-in or reading-out, and the other $$I_2=\frac{1}{\sqrt{2}}I_{\frac{f}{2}}\cos\left(\frac{wt}{2}-\frac{\pi}{4}\right)$$

which is delayed in phase by $$\frac{\pi}{4}$$

with respect to said optimum current, are assigned to an X-row and a Y-column, so that an optimum current $$I_{\frac{f}{2}}\cos\frac{wt}{2}$$

is available at only the selected intersection through which a current $I_1+I_2$ flows.

Assume that when a current flows through a magnetic core which has been memorized the read-out output is proportional to the square of said current. Then the current through a non-selected core will be either of the three as follows:

$$0$$

$$I_1=\frac{1}{\sqrt{2}}I_{\frac{f}{2}}\cos\left(\frac{w}{2}t+\frac{\pi}{4}\right)$$

or $$I_2=\frac{1}{\sqrt{2}}I_{\frac{f}{2}}\cos\left(\frac{w}{2}t-\frac{\pi}{4}\right)$$

As a consequence, the read-out output will be either of the three, as follows:

$$0$$

$$KI_1^2=K\frac{1}{4}I_{\frac{f}{2}}^2(1-\sin wt)$$

or $$KI_2^2=K\frac{1}{4}I_{\frac{f}{2}}^2(1+\sin wt)$$

where K is a constant. The result is that the output will have a phase difference $$\frac{\pi}{2}$$

with respect to the oscillation phase $\pm\cos wt$ of the switching element P, giving no information to said element.

On the other hand, since the read-out output of the selected core is expressed as $$K(I_1+I_2)^2=K\frac{1}{2}I_{\frac{f}{2}}^2(1+\cos wt)$$

the output will be in phase with the oscillation in the switching element, thus giving information. Generally speaking, the value of K varies with the current flowing through a magnetic core and the value for a range in which cores are used as a memory apparatus will be small for a small current and vice versa. In other words, the address selection performed is not dependent only on the phasing relations; the amplitude difference between the read-out outputs from the selected and non-selected cores will also assist in ensuring the operation of address selection.

Now, a case of writing-in will be described. Suppose a current from a switching element be expressed as $I_0=\pm I_f\cos wt$, then through a non-selected core, either of the three currents as follows will flow:

$$I_0=\pm I_f\cos wt$$

$$I_1+I_0\frac{1}{\sqrt{2}}I_{\frac{f}{2}}\cos\left(\frac{w}{2}t+\frac{\pi}{4}\right)\pm I_f\cos wt$$

or $$I_2+I_0\frac{1}{\sqrt{2}}I_{\frac{f}{2}}\cos\left(\frac{w}{2}t-\frac{\pi}{4}\right)\pm I_f\cos wt$$

If it is only selected such that $$I_{\frac{f}{2}}:I_f=1:0.4$$

the information which has been memorized prior to the write-in operation will not be extracted.

Figure 4:
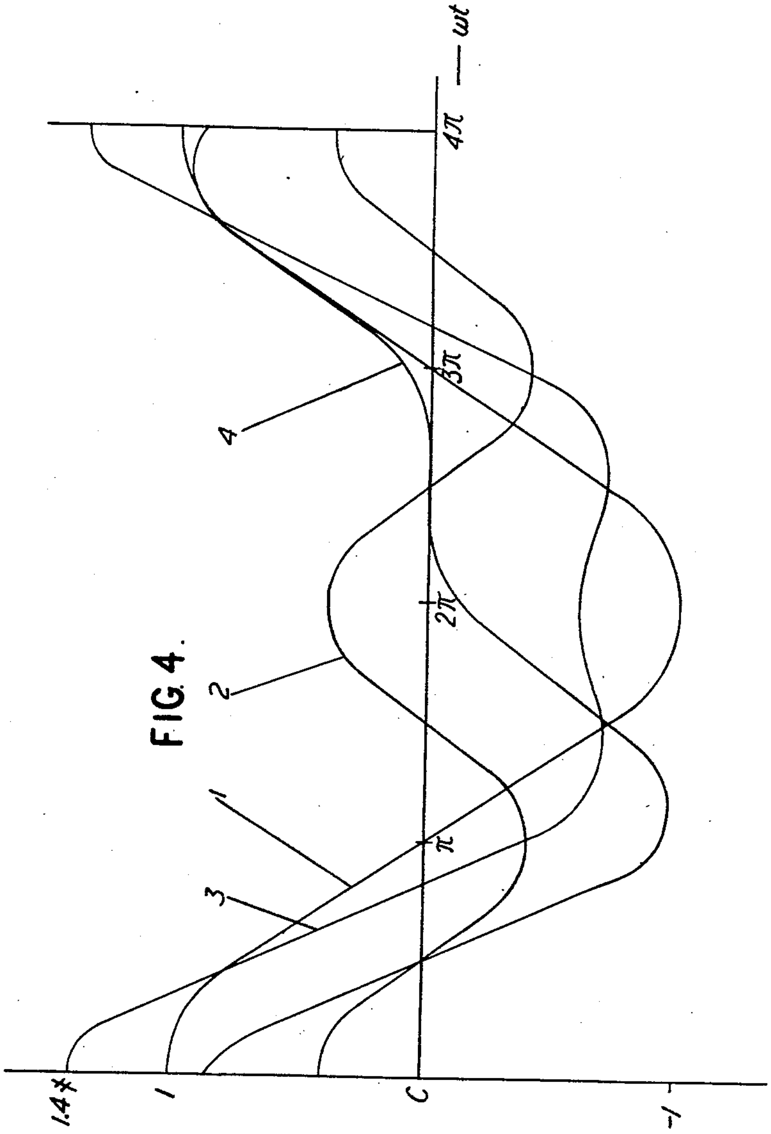
FIG. 4 is a family of current curves illustrating the operation of the system of FIG. 3.

On the other hand, a current $I_1+I_2+I_0$ which is equal to $$I_{\frac{f}{2}}\cos\frac{w}{2}t\pm I_f\cos wt$$

will flow through the selected magnetic core, thus enabling new information to be written in. For a clear understanding of these relationships, let an example of various waveforms for a case of $$I_{\frac{f}{2}}=0.4I_{\frac{f}{2}}$$

be illustrated in FIG. 4.

In FIG. 4, 1 denotes a current of frequency $$\frac{f}{2}$$

that flows through the selected magnetic core, or $I_1+I_2$ which is equal to cos $$\frac{w}{2}t$$

2 denotes a current of frequency $f$, or $I_0$ ($=0.4\cos wt$) supplied from the switching element P;

3 denotes a composite waveform of 1 and 2, or a write-in current flowing through the selected magnetic core which is equal to $I_1+I_2+I_3$ or $$\cos\frac{w}{2}t+0.4\cos wt$$

4 denotes an example of current flowing through a non-selected magnetic core which is equal to $$I_1+I_0\text{ or }\frac{1}{\sqrt{2}}\cos\frac{w}{2}t+\frac{\pi}{4}+0.4\cos wt$$

According to this figure, since the maximum amplitudes of the write-in current 4 through the non-selected magnetic core in the positive and negative directions are equal and they do not exceed those of waveform 1, or read-out current, no information will be written in, nor will it be extracted. On the other hand, since the write-in current through the selected core becomes irregular and the amplitudes in the positive and negative directions are different, as shown by the waveform 3, exceeding the amplitude of write-in current 1, the write-in operation will be performed. Although an example has been described in FIG. 4 referring to a case in which $$I_{\frac{f}{2}}=1,\ I_t=0.4$$

the aforementioned relationship will hold even if the ratio of $$I_{\frac{f}{2}} \text{ to } I_t$$

may deviate from the value of 1:0.4 to a certain extent. A certain amount of allowance will also be permitted for the phase difference of $$\frac{\pi}{4}$$

It is also to be noted that the invention is not limited to cosine functions; conversions to other functions such as sine are easily accomplished and would provide equivalent results.

To recapitulate, this system offers an address selection method for magnetic-core matrix memory apparatus, which dispenses with both the switching-over operation for a current of frequency $2f$ of comparatively large power and the rigorous characteristics of magnetic cores.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An address selection system for a magnetic core memory apparatus having a plurality of magnetic cores arranged in columns and rows comprising a row wire serially coupled to each core of a row, a column wire serially coupled to each core of a column, a further wire serially coupled to all of the cores of the matrix, means for feeding an alternating current of formula $$I \cos\left(wt+\frac{\pi}{4}\right)$$

to a row wire, means for feeding an alternating current of formula $$I \cos\left(wt-\frac{\pi}{4}\right)$$

to a column wire, means for feeding an alternating current of formula $\pm KI \cos (2wt)$ to said further wire wherein $K \cong .4$ and $I <$ the current necessary to saturate a core and $w=2\pi f$, whereby the core selected by the occurrence of all three of said currents may be urged to one magnetic state.

2. An address selection system for a magnetic core memory apparatus, as defined in claim 1, in which the means for feeding alternating current to the further wire comprises a parametron switch.

3. An address selection system for a magnetic core memory apparatus having a plurality of magnetic cores arranged in columns and rows comprising a row wire serially coupled to each core of a row, a column wire serially coupled to each core of a column, a further wire serially coupled to all of the cores of the matrix, means for feeding an alternating current of formula $I \cos (wt+X)$ to each row wire, means for feeding an alternating current of formula $I \cos (wt-X)$ to each column wire, and means connected to said further wire for recognizing and amplifying the phase of the frequency output thereon, wherein $I <$ the current necessary to saturate a core and $$X \approx \frac{\pi}{4} \text{ and } w=2\pi f$$

4. An address selection system as claimed in claim 3 in which said last mentioned means comprises a parametron and means for deriving from said parametron a current of $\pm I_1 \cos (2wt)$.

References Cited in the file of this patent

UNITED STATES PATENTS

| | | |
|---|---|---|
| 2,845,611 | Williams | July 22, 1958 |
| 2,928,008 | Hidetosi Takahasi et al. | Mar. 8, 1960 |
| 2,928,053 | Zen Iti Kiyasu et al. | Mar. 8, 1960 |
| 2,946,045 | Eiichi Goto | July 19, 1960 |
| 2,948,818 | Eiichi Goto | Aug. 9, 1960 |
| 2,958,074 | Kilburn et al. | Oct. 25, 1960 |

OTHER REFERENCES

"A Radio Frequency Nondestructive Readout for Magnetic Core Memories" by B. Widrow. Transactions of the I.R.E., December 1954, pp. 12–15.